United States Patent [19]

Beaudet, Jr.

[11] Patent Number: 5,317,774
[45] Date of Patent: Jun. 7, 1994

[54] CABLE PULLING TOOL

[76] Inventor: Edward J. Beaudet, Jr., 318 Newport Rd., W. Bristol, Pa. 19007

[21] Appl. No.: 72,078

[22] Filed: Jun. 7, 1993

[51] Int. Cl.⁵ .......................................... B65H 59/00
[52] U.S. Cl. .................................... 7/107; 7/158; 81/9.4; 254/134.3 FT
[58] Field of Search ............... 294/3, 113, 114, 1.1, 294/24; 7/107, 158; 81/487, 9.4, 424.5, 418, 420; 30/90.1; 15/104.31, 104.33, 143 R; 254/134.3 FT, 134.3 R

[56] References Cited

U.S. PATENT DOCUMENTS

| | | | |
|---|---|---|---|
| 2,542,249 | 2/1951 | Higgins | 81/418 |
| 2,598,146 | 5/1952 | Toys | 81/418 |
| 2,606,466 | 8/1952 | Wright | 81/418 |
| 3,557,643 | 1/1971 | Wegin | 81/9.4 |
| 5,022,633 | 6/1991 | Lopes | 254/134.3 FT |

*Primary Examiner*—Robert C. Watson
*Attorney, Agent, or Firm*—E. Michael Combs

[57] ABSTRACT

A tool structure is arranged to include cooperating pivoted first and second lever plates having handles mounted at their first ends, with the second ends defining facing jaws arranged to receive a cable therethrough, wherein the cable is arranged for capture relative to an abutment plate cooperative with a receiving flange on the second jaw as the abutment plate is mounted relative to the first jaw.

4 Claims, 4 Drawing Sheets

CABLE PULLING TOOL

BACKGROUND OF THE INVENTION

1. Field of the Invention

The field of invention relates to cable pulling apparatus, and more particularly pertains to a new and improved cable pulling tool arranged for ease of grasping and manipulation of the cable to direct cable through conduit and the like.

2. Description of the Prior Art

The U.S. Pat. Nos. 3,698,059; 3,952,999; 4,055,290; and 4,787,660 are examples of cable and rope pulling structure, wherein the instant invention attempts to overcome deficiencies of the prior art by providing for a compact tool structure arranged for ease of manipulation in use to direct cable through a conduit in a pulling procedure and in this respect, the present invention substantially fulfills this need.

SUMMARY OF THE INVENTION

In view of the foregoing disadvantages inherent in the known types of cable pulling apparatus now present in the prior art, the present invention provides a cable pulling tool wherein the same employs an abutment plate arranged in cooperation with first and second cylinder members to engage a cable member directed therebetween. As such, the general purpose of the present invention, which will be described subsequently in greater detail, is to provide a new and improved cable pulling tool which has all the advantages of the prior art cable pulling apparatus and none of the disadvantages.

To attain this, the present invention provides a tool structure including cooperating pivoted first and second lever plates, having handles mounted at their first ends, with the second ends defining facing jaws arranged to receive a cable therethrough, wherein the cable is arranged for capture relative to an abutment plate cooperative with a receiving flange on the second jaw as the abutment plate is mounted relative to the first jaw.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cable pulling tool which has all the advantages of the prior art cable pulling apparatus and none of the disadvantages.

It is another object of the present invention to provide a new and improved cable pulling tool which may be easily and efficiently manufactured and marketed.

It is a further object of the present invention to provide a new and improved cable pulling tool which is of a durable and reliable construction.

An even further object of the present invention is to provide a new and improved cable pulling tool which is susceptible of a low cost of manufacture with regard to both materials and labor, and which accordingly is then susceptible of low prices of sale to the consuming public, thereby making such cable pulling tools economically available to the buying public.

Still yet another object of the present invention is to provide a new and improved cable pulling tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
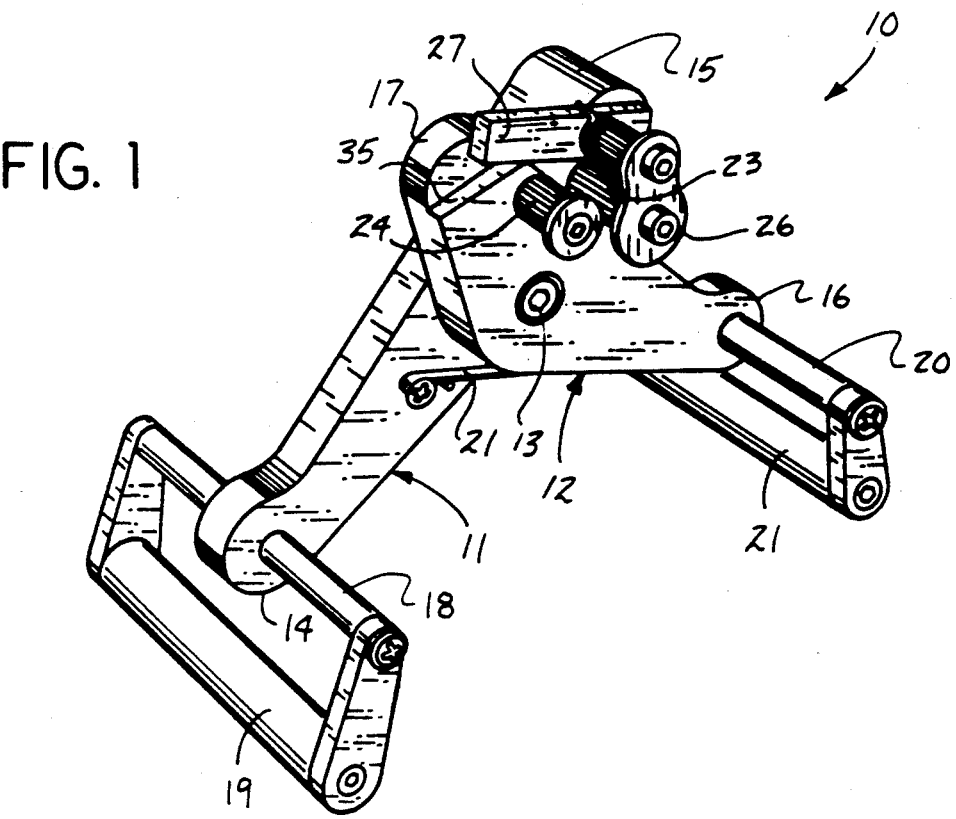
FIG. 1 is an isometric illustration of the invention.

With reference now to the drawings, and in particular to FIGS. 1 to 8 thereof, a new and improved cable pulling tool embodying the principles and concepts of the present invention and generally designated by the reference numeral 10 will be described.

More specifically, the cable pulling tool 10 of the instant invention essentially comprises a first lever plate 11 pivotally mounted to a second lever plate 12 about an axle 13. The first lever plate includes a first lever plate first end 14 spaced from a first lever plate arcuate second end 15, the second lever plate 12 having a second lever plate first end 16 spaced from a second lever plate arcuate second end 17, with the first and second lever plates arcuate second ends 15 and 17 respectively defining respective facing first and second jaws 29 and 30 (see FIG. 3). First and second handles are mounted respectively to the respective first and second lever plate first ends 14 and 15, with the first handle having a first handle first tube 18 orthogonally directed through the first lever plate adjacent the first lever plate first end, the second lever plate having a second handle first tube 19 extending orthogonally through the second lever plate adjacent the second lever plate first end 16, with the first and second handle first tubes 18 and 19 oriented parallel relative to one another, and having spaced and respective first and second handle second tubes 20 and 21 arranged for manual grasping and ease of manipulation of the first and second lever plates.

Figure 2:
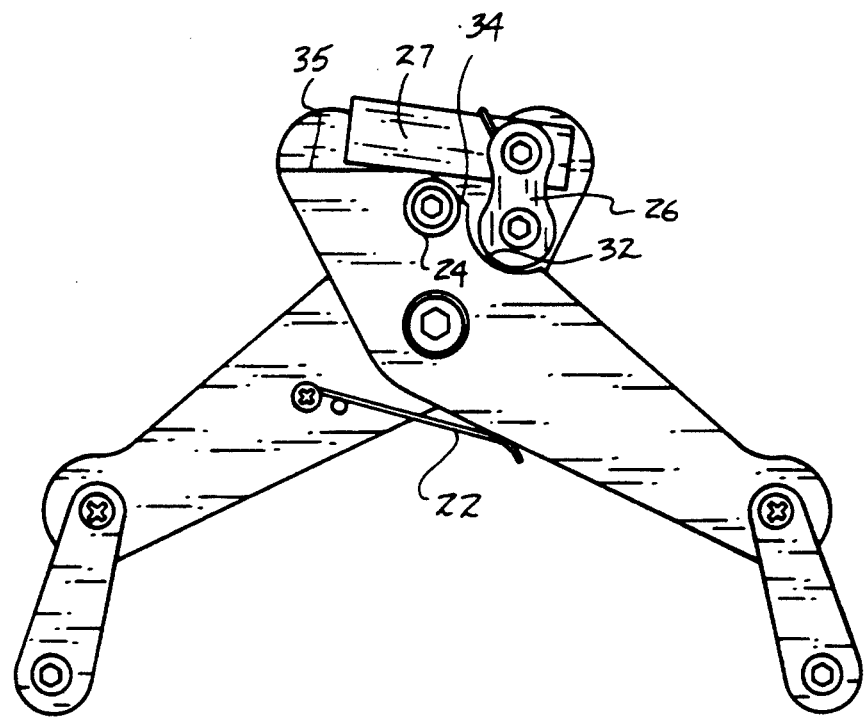
FIG. 2 is an orthographic view of the invention.
Figure 3:
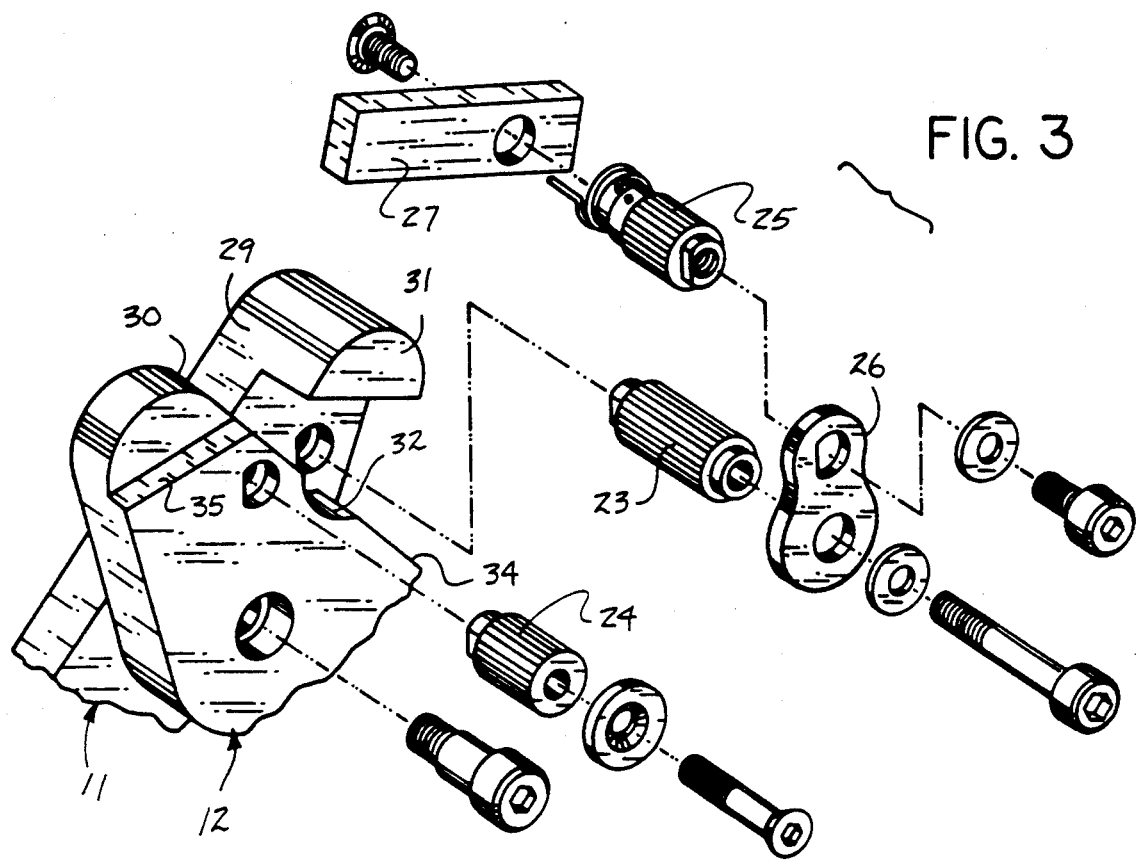
FIG. 3 is an isometric exploded view of the head structure of the tool structure.
Figure 4:
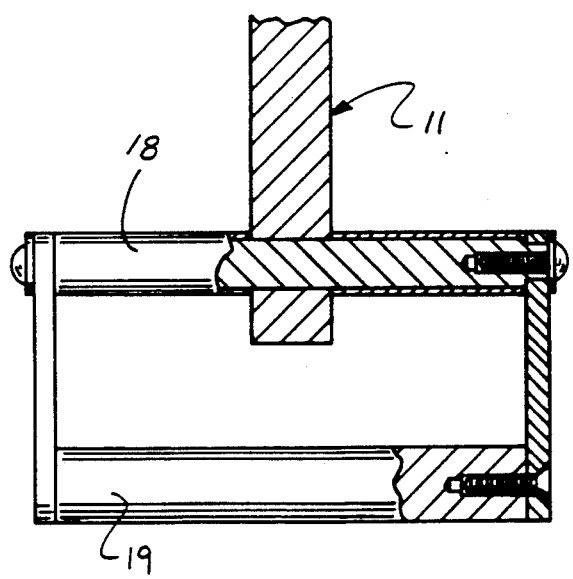
FIG. 4 is an orthographic view, partially in section, indicating the mounting of a handle member relative to an associated lever plate.
Figure 5:
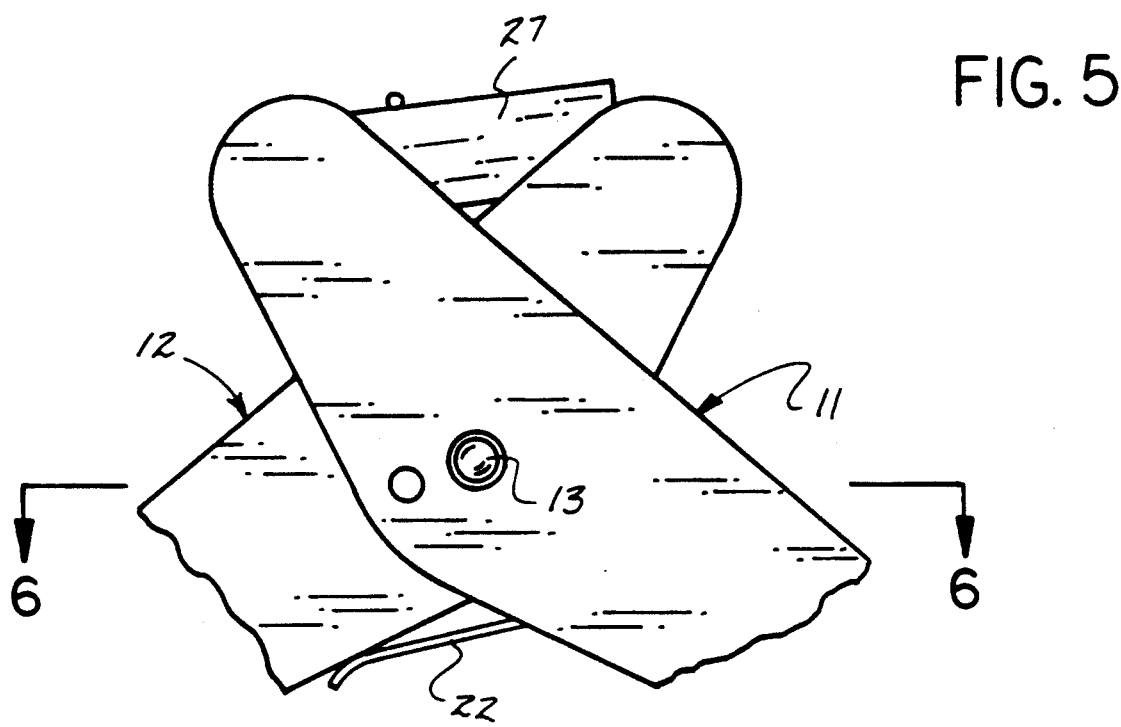
FIG. 5 is an orthographic view of the invention.
Figure 6:
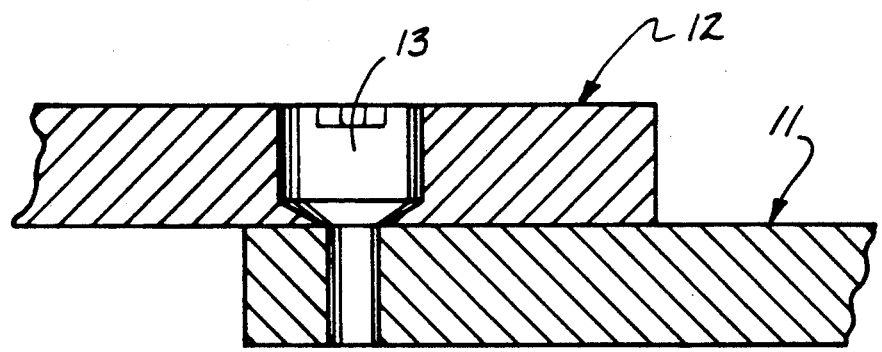
FIG. 6 is an orthographic view, taken along the lines 6—6 of FIG. 5 in the direction indicated by the arrows.

A spring plate 22 mounted to the first lever plate in adjacency to the axle 13 is arranged to extend from the first lever plate between the axle 13 and the first lever plate first end in abutment with the second lever plate to effect a biased spacing of the first and second lever plates, as indicated in FIG. 2.

A first ribbed cylinder 23 is orthogonally mounted to the first lever plate in adjacency to the first jaw 29, with a second rib cylinder 24 mounted orthogonally to the second lever plate in adjacency to the second jaw 30, with the first and second cylinders arranged in adjacency relative to one another, wherein the lever plates are directed towards one another to secure a cable between the first and second ribbed cylinders to insure clamping of such cable structure, and wherein the first ribbed cylinder 23 is accommodated by the second lever plate by a second jaw arcuate recess 32 in facing relationship relative to the first ribbed cylinder. A support web 26 extends from the first ribbed cylinder 23 in an orthogonal relationship parallel to the first and second lever plates, and including a mounting roller 25 secured to the support web 26, wherein the mounting roller 25 includes an abutment plate 27 pivotally mounted thereto, wherein the abutment plate 27 extends from the first ribbed cylinder 23 to position over the second ribbed cylinder 24 and therebeyond and received upon a second jaw abutment plate receiving flange 35 orthogonally directed from the second lever plate and obtusely intersecting a second jaw abutment plate facing side wall 34, having said arcuate recess 32 therewithin. The first jaw includes a first jaw projecting boss 31 extending over the abutment plate 27 to prevent over-rotation of the abutment plate and maintain its orientation relative to the receiving flange 35. In this manner, the cable when directed through the first and second jaws 29 and 30 is captured between the first and second cylinders 23 and 24 and engaged by the abutment plate 27. An abutment plate spring (FIG. 3) interposed between the abutment plate and the roller 25 biases the abutment plate to the second cylinder 24.

Figure 7:
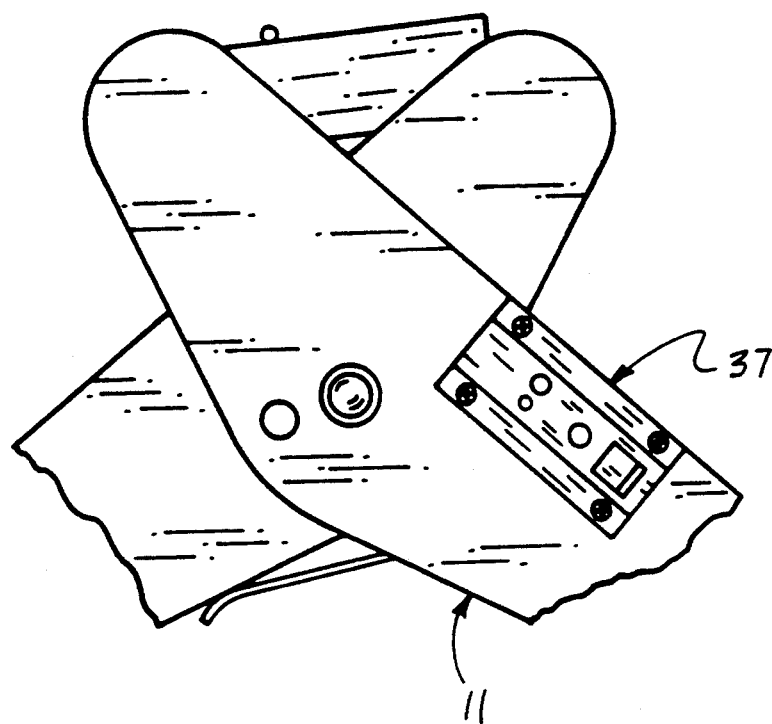
FIG. 7 is an orthographic view of the lever plates having a wire stripping tool.
Figure 8:
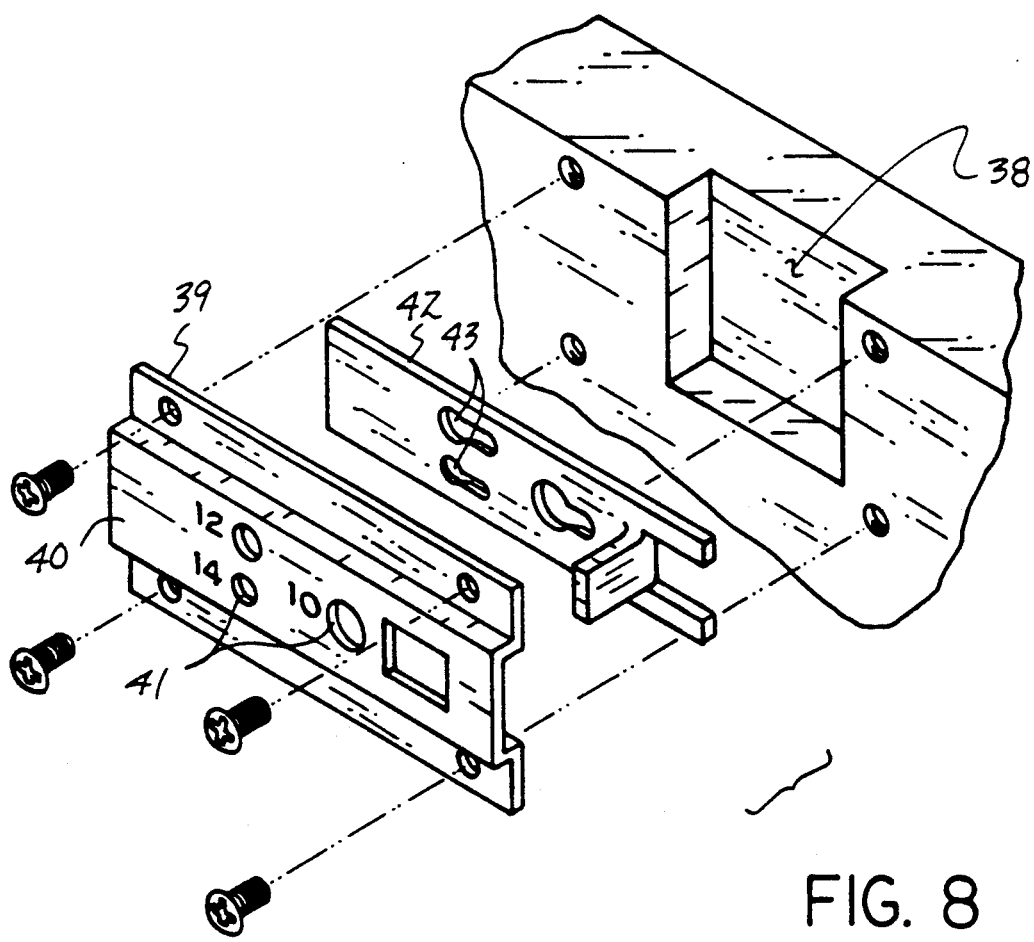
FIG. 8 is an enlarged isometric illustration in exploded view of the stripping tool structure.

The FIGS. 7 and 8 indicate the use of a wire stripper apparatus 37 positioned over a first jaw plate recess 38, with the stripper apparatus further including a fixed plate 39 fixedly mounted over the recess 38. The fixed plate 39 includes a front wall 40 having a plurality of openings 41 therethrough, wherein a slide plate 42 is received in sliding relationship to the front wall 40 between the front wall and the recess, and including a plurality of keyhole openings 43 directed through the slide plate, wherein directing of a wire member into one of said openings 41 aligns said wire within an associated keyhole opening 43 and upon directing the slide plate 42 into the fixed plate 39 along the front wall 40, the wire is captured within the constricted portion of the keyhole opening and such wire sheathing is separated from the wire core upon pulling of the wire from the wire stripper apparatus. The plurality of openings accommodate various gauges of wire in a stripping procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cable pulling tool, comprising, a first lever plate and a second lever plate pivotally mounted relative to one another about an axle in a scissor-like relationship, with the first lever plate having a first lever plate first end spaced from a first lever plate arcuate second end, the second lever plate having a second lever plate first end spaced from a second lever plate arcuate second end, and a first handle mounted to the first lever plate first end extending therefrom, with the first handle orthogonally oriented relative to the first lever plate, and a second handle fixedly and orthogonally mounted to the second lever plate adjacent the second lever plate second end, and the first lever plate arcuate second end includes a first jaw, the second lever plate arcuate second end including a second jaw, wherein the first jaw and the second jaw are arranged in a facing relationship relative to one another, and clamp means mounted to the first lever plate and the second lever plate adjacent the first jaw and the second jaw for securing a cable directed through the first jaw and the second jaw, and the clamp means includes a first ribbed cylinder orthogonally mounted to the second lever plate adjacent the first jaw, and a second ribbed cylinder orthogonally mounted to the second lever plate in spaced parallel adjacency to the first ribbed cylinder, with the second ribbed cylinder including a connecting web, the connecting web. having a mounting roller, with the mounting roller including an abutment plate, with the abutment plate having an abutment plate spring interposed between the abutment plate and the mounting roller, with the abutment plate biased towards the second ribbed cylinder by the abutment plate spring.

2. A tool as set forth in claim 1 wherein the first lever plate includes a first jaw projecting boss extending over the abutment plate at the mounting roller, and the second lever plate having a second lever plate facing side wall in a facing relationship relative to the first ribbed cylinder, wherein the facing side wall includes an arcuate recess to receive the first ribbed cylinder, and wherein a receiving flange is fixedly and orthogonally mounted projecting from the second lever plate extending to the facing side wall, wherein the receiving flange is arranged to receive the abutment plate thereon.

3. A tool as set forth in claim 2 wherein the first handle includes a first tube orthogonally and fixedly directed through the first lever plate, and the second handle having a second handle first tube parallel to the first handle first tube, with the second handle first tube orthogonally and fixedly directed through the second lever plate, and the first handle having a first handle second tube spaced from and parallel the first handle first tube, and the second handle having a second handle second tube spaced from and parallel the second handle first tube.

4. A tool as set forth in claim 3 including a wire stripper mounted to the first lever plate, with the wire stripper having a first lever plate recess directed into the first lever plate, with a fixed plate fixedly mounted over the recess, the fixed plate having a fixed plate front wall, the fixed plate front wall including a plurality of openings, and a slide plate slidably directed along the fixed plate front wall, with the slide plate having a plurality of keyhole openings, wherein each of said keyhole openings is arranged for alignment with one of said openings.

* * * * *